United States Patent [19]

Fitzpatrick

[11] Patent Number: 4,539,753
[45] Date of Patent: Sep. 10, 1985

[54] INSPECTION TOOL

[76] Inventor: John F. Fitzpatrick, 801 NW. 54th St., Apt. 8, Seattle, Wash. 98107

[21] Appl. No.: 485,897

[22] Filed: Apr. 18, 1983

[51] Int. Cl.³ .............................................. G01B 5/25
[52] U.S. Cl. .............................. 33/169 C; 33/180 R; 33/185 R
[58] Field of Search ............ 33/169 C, 172 D, 180 R, 33/178 B, 174 Q, 180 R, 181 R, 185 R, 201, 174 L

[56] References Cited

U.S. PATENT DOCUMENTS

| | | | |
|---|---|---|---|
| 1,157,389 | 10/1915 | Hess | 33/178 B |
| 2,556,067 | 6/1957 | Coffer, Jr. | 33/185 R |
| 2,657,470 | 11/1953 | Allen et al. | 33/185 R |
| 3,518,769 | 7/1970 | Bullard et al. | 33/201 |
| 4,320,580 | 3/1982 | Williams | 33/185 R |

Primary Examiner—Willis Little
Attorney, Agent, or Firm—Seed and Berry

[57] ABSTRACT

An inspection tool for determining the location of a hole in a surface, having: a shaft sized for insertion in the hole and holding the tool in fixed relative relation thereto during tool usage, the shaft having a longitudinal axis in alignment with the center line of the hole when inserted therein; a first member having a substantially spherical surface portion, the first member being attached to the shaft, with the center point of the spherical portion of the first member aligned along the shaft axis; and a second member having a substantially spherical surface portion, the second member being attached to the first member remote from the shaft, with the center point of the spherical portion of the second member aligned along the shaft axis, the spherical portion of the second member having a smaller radius of curvature than the spherical portion of the first member; and a collar attached to the shaft between the shaft and the first member, the collar having an engagement surface extending radially outward from the shaft axis for engaging the surface in which the hole is located and holding the first and second members at predetermined distances above the surface. The spherical portions of the first and second members are made optically discernible, such as by use of contrasting colors. In an alternative disclosed embodiment, the spherical portions of the first and second members have substantially equal radii of curvature, and the second member is removably attached to the first member. The second member has a concave portion facing toward the first member for nesting of a portion of the first member therein.

18 Claims, 3 Drawing Figures

U.S. Patent   Sep. 10, 1985   4,539,753
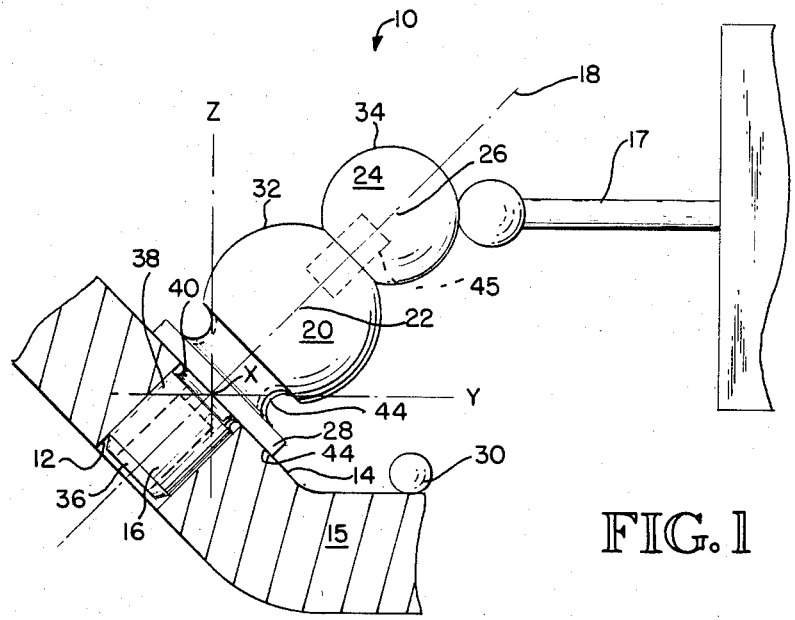
FIG. 1
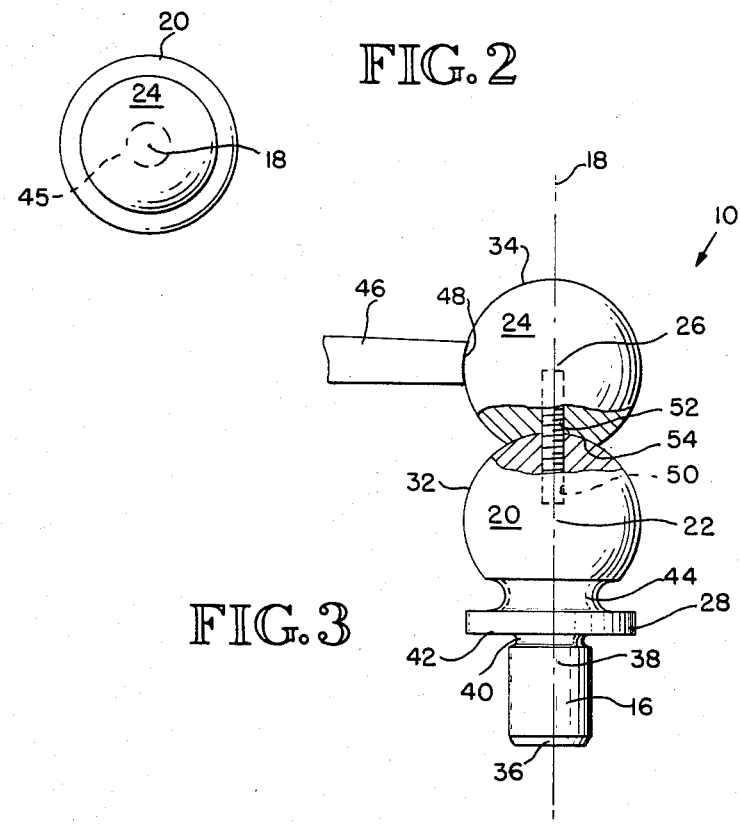
FIG. 2
FIG. 3

INSPECTION TOOL

TECHNICAL FIELD

This invention relates generally to inspection tools, and more particularly, to geometric inspection tools for determining the location of a hole in a surface.

BACKGROUND ART

In the past, it has been difficult to determine the precise location of holes in surfaces when performing quality control inspections. When conforming a part to the dimensions of a drawing, it is critical to determine the three axes coordinates of the center of a hole, such as a drilled or cast hole, as well as other points on the part with respect to a preselected, known reference point. Coordinate measuring machines are frequently used to perform the necessary measurements to determine these coordinates; however, when a hole is located in an oblique surface which is not parallel to two of the three orthogonal reference axes (commonly denominated X, Y, Z) or the hole is formed in the part at other than a right angle to the surface, it is extremely difficult to use these machines to achieve accurate measurements.

One such measuring machine tracks the position and travel of a probe supported on an arm for movement along the three axes. The probe has a tracing ball or electronic probe mounted on a shaft, and the user moves the ball around to read the coordinates of various surface points relative to a preselected reference point. Use of this machine to determine the location of a hole requires measurement of several points common to the interior of the hole and calculation of the hole's location therefrom. If, however, the hole is in an oblique surface or skewed relative to the surface, the measurements made by the probe provide coordinates of an ellipse instead of a circle, making it difficult to calculate a correct hole location. If the angle of the surface or hole is extreme relative to the orientation of the probe, it is sometimes impossible to even trace the hole with the tracing ball without the shaft of the probe contacting the part and producing nonsensical readings. While these problems can be eliminated by reorienting the part relative to the measuring machine, or vice versa, to position the surface with the hole parallel to two of the axes or the skewed hole parallel to one of the axes, this requires inconvenient, time-consuming and expensive movement of the part and re-indexing of the part to the reference point. Such a solution is impractical if the part has holes to be measured in many different oblique surfaces.

For a flat surface parallel to two of the three reference axes with the hole formed at a right angle relative to the surface, a conventional tooling ball may be used as an aid to determine the hole location. Such a tooling ball consists of a shaft insertable in the hole which holds the central longitudinal axis of the tool in alignment with the center line of the hole, a surface-engaging collar extending radially from the shaft, and a spherical ball attached to the shaft with its center point along the central axis of the tool. The shaft of the tooling ball is inserted into the hole, and the user takes several measurements of the ball's surface with the measuring machine. A computer, typically comprising part of the measuring machine, is used to compute the coordinates of the center point of the ball. Since the collar holds the ball, and hence its center point, at a known distance away from the surface, a simple adjustment to the coordinates of the center point of the ball by the amount the center point is held away from the surface will yield the coordinates of the center of the hole.

A conventional tooling ball, however, will not work on an oblique surface without reorienting the part and reindexing the machine, as discussed above. This is because the tooling ball produces only the coordinates of a point in space without any known reference to the hole. Unless that point is known to be at a predetermined distance away from the hole along one of the three reference axes, as in the situation discussed above, the coordinates of the hole location cannot be determined from one point. With a skewed hole, the collar will not sit flush against the surface, so the center point of the ball will be at an unknown distance away from the surface, preventing determination of the hole coordinates.

Another type of measuring machine uses a non-contact technique involving a camera. The camera is positioned relative to the part and uses images to determine the coordinates of points on the part. It is, of course, difficult to produce a true image of a hole, particularly a hole in an oblique surface.

It will therefore be appreciated that there has been a significant need for an inspection tool which may be conveniently used to determine the location of a hole in an oblique surface without reorientation of the part or measuring machine, or reindexing of the reference point. The inspection tool should also be usable with non-contact type measuring machines. The present invention fulfills this need, and further provides other related advantages.

DISCLOSURE OF INVENTION

The present invention resides in an inspection tool for use with a coordinate measuring machine to determine the location of a hole in a surface, the tool having centering means for holding the tool in fixed relative relation to the hole during tool usage, and for providing a reference line in alignment with the center line of the hole; first means measurable by the machine for determining coordinates of a first point aligned along the reference line; and second means measurable by the machine for determining coordinates of a second point aligned along the reference line, distant from the first point, whereby the coordinates of the first and second points may be used to determine the center line of the hole, the coordinates of the point of intersection of the center line with the known plane of the surface being the location of the hole. The tool further includes positioning means for positioning the first and second points at predetermined distances above the surface.

More specifically, in the presently preferred embodiment of the invention, the centering means is a shaft sized for insertion in the hole with a longitudinal axis in alignment with the center line of the hole when inserted therein. The first means is a first member attached to the shaft and having a substantially spherical surface portion with its center point aligned along the shaft axis. The second means is a second member attached to the first member remote from the shaft, and having a substantially spherical surface portion with its center point aligned along the shaft axis. The positioning means is a surface-engaging collar attached to the shaft between the shaft and the first member, with an engagement surface extending radially outward from the shaft axis for engaging the surface in which the hole is located.

In one embodiment of the tool, the spherical portion of the second member has a smaller radius of curvature than the spherical portion of the first member. The spherical portions of the first and second members may be made optically discernible, such as by use of contrasting colors. The second member may be fixedly or removably attached to the first member.

In another embodiment of the tool, the spherical portions of the first and second members have substantially equal radii of curvature. The second member may also have a concave portion facing toward the first member for nesting of a portion of the first member therein.

Other features and advantages of the invention will become apparent from the following detailed description, taken in conjunction with the accompanying drawings.

BRIEF DESCRIPTION OF THE DRAWINGS

FIG. 1 is a side elevation view of an inspection tool embodying the present invention;

FIG. 2 is a top plan view of the tool shown in FIG. 1; and

FIG. 3 is a side elevational view of an alternative embodiment of the tool shown in FIG. 1.

BEST MODE FOR CARRYING OUT THE INVENTION

As shown in the drawings for purposes of illustration, the present invention is embodied in an inspection tool (indicated generally by reference numeral 10) used to determine the location of a hole 12 in a surface 14 of a part 15 using a coordinate measuring machine 17.

In accordance with the invention, the tool includes cludes a shaft 16 for insertion in the hole 12, with a longitudinal reference axis or line (indicated by phantom line 18) in alignment with the center line of the hole; a first member 20 attached to the shaft with a center point 22 aligned along the shaft axis; and a second member 24 attached to the first member remote from the shaft with a center point 26 aligned along the shaft axis. The tool further includes a collar 28 attached to the shaft 16 for engaging the surface 14.

By taking sufficient measurements of points on the surface of each of the first and second members 20 and 24 with the machine 17, the coordinates of the respective center points 22 and 26 may be determined relative to a preselected reference point 30 on the part 15 using three orthogonal reference axes denominated X, Y, and Z. The two center points 22 and 26, known to lie along the center line of the hole, determine the center line. After taking sufficient measurements of points on the surface 14 around the hole 12 to determine the plane on the surface using conventional techniques, the point of intersection of the hole center line and the surface plane may be conveniently calculated to yield the coordinates of the surface location of the hole.

To facilitate ease of use, the first member 20 has a substantially spherical surface portion 32, with the center point of its radius of curvature being the center point 22; and the second member 26 has a substantially spherical surface portion 34, with the center point of its radius of curvature being the center point 26. Use of the spherical surface portions 32 and 34 reduces to a minimum the number of surface point measurements which need to be taken with the measuring machine 17 to determine the center points 22 and 26. Since a spherical shape inherently has only one center point and is symmetrical relative to that center point, concern over the rotational orientation of the tool 10 in the hole 12 is eliminated.

In the embodiment shown in the drawings, the shaft 16 is cylindrical and sized to fit snugly within the hole 12 to maintain the tool 10 in fixed relative relation to the hole and to hold the the center points 22 and 26 in alignment with the center line of the hole during tool usage. Since this requires a different tool 10 for each size of hole 12, an alternative approach is to have one tool with a shaft 16 of a desired diameter and a set of adapters or sleeves (not shown). Each adapter would have a different outside diameter sized to snugly fit within one of a variety of different size holes 12, and a standard inside diameter sized to snugly receive the shaft 16 of the tool 10.

The shaft 16 has one end 36 slightly tapered to ease its insertion into the hole 12. The first member 20 is attached to an end 38 of the shaft 16 opposite the tapered end 36. A circumferential groove 40 is provided at the end 38. The collar 28 is also attached to the shaft 16 at its end 38, immediately adjacent to the first member 20, and has an engagement surface 42 extending radially outward from the shaft axis 18 and facing toward the tapered end 36 for engaging the surface 14 around the hole 12. The engagement surface 42 limits the insertion of the shaft 16 into the hole 12 and holds the center points 22 and 26 at a predetermined distance above the surface 14, the latter being useful when the tool 10 is used in the conventional manner to locate holes formed at right angles in flat surfaces which are parallel to two of the three reference axes. The collar 28 may be magnetized to hold the tool 10 in place against the surface 14 when used with parts manufactured of ferrous material.

The first member 20 has a pedestal 44 which maintains the spherical surface portion 32 clear of the surface 14 to provide the user with easier access to the spherical surface portion while taking measurements with the measuring machine 17. This reduces interference from the part surface 14 with the measuring machine 17, particularly for machines of the type using an elongated contact probe.

Because of the alignment of the center points 22 and 26 of the first and second members 20 and 24, respectively, with the shaft axis 18 (as previously discussed), when viewed from above as in FIG. 2, the first and second members appear concentric about the shaft axis. The second member 24 may be removably attached to the first member 20; however, to reduce the chances for error by misalignment or improper spacing between the members, it is preferred to fixedly attach the members together. In the embodiment of the invention shown in FIG. 1, the second member 24 is fixedly attached to the first member 20 by a pin 45, and the spherical surface portion 34 of the second member 24 is provided with a smaller radius than the spherical surface portion 32 of the first member 20. This constructon exposes more surface area of the first member 20 for measurement and reduces the interference of the second member with the taking of measurements of the first member with the measuring machine 17. It is noted that the second member 24, in effect, shields some portions of the first member 20 from the measuring machine 17 when the tool 10 is used for holes 12 at certain angles to the measuring machine, particularly the areas of the first member immediately adjacent the points of attachment of the two members.

Providing a second member 24 of smaller size also makes the tool 10 useful with a non-contact measuring machine utilizing a camera (not shown). If the first and second members 20 and 24 are provided with contrasting surface colors or otherwise made to be optically discernible, the center line of the hole 12 may be easily determined by moving the camera to a position above the members where the members appear concentric with respect to each other. The orientation and position of the camera relative to the three reference axes will determine the center line of the hole 12, and as previously discussed, calculating the intersection of that line with the plane of the surface 14 about the hole will yield the coordinates of the hole location.

In another embodiment of the invention shown in FIG. 3, the radii of curvature of the spherical surface portions 32 and 34 of the first and second members 20 and 24, respectively, are substantially equal. The tool 10 may be used with the measuring machine 17 or with a calibrated scale 46 which has an end 48 shaped to conform to the contour of the spherical surface portions 32 and 34 for measuring the distance from the members to a known reference plane. The scale 46 is calibrated to automatically include the radius of the spherical surface portions 32 and 34, and hence the distance measured by the scale is the distance to the center points 22 and 26. By taking measurements relative to three orthogonal reference planes, the coordinates of the center points 22 and 26 may be determined, and hence the center line of the hole 12, which is used to calculate the location of the hole 12. The scale 46 is generally used in conjunction with optical measuring instruments (not shown).

In this embodiment, the second member 24 is removably attached to the first member 20, and when removed, measurements may be made of the first member from positions otherwise blocked by the second member when attached. The first member 20 has internal threads 50 to receive a screw 52 fixedly connected to the second member 24 and extending therefrom. The threads 50 and screw 52 are positioned to place the center points 22 and 26 into alignment with the shaft axis 18 when the first and second members 20 and 24 are fully attached together. To improve the alignment of the first and second members 20 and 24 when attached together, the second member has a concave portion 54 facing toward the first member for nesting of the first member therein.

In the presently preferred embodiments of the invention, the first member 20, the collar 28 and the shaft 12 are precision-machined or cast as a unitary structure.

From the foregoing, it will be appreciated that the invention, as described herein for purposes of illustration, provides an inspection tool which may be used with contact and non-contact type coordinate measuring machines to facilitate determination of the location of a hole in an oblique surface or a hole at other than a right angle to a surface. It will also be appreciated that although specific embodiments of the invention have been described herein for purposes of illustration, various modifications may be made without departing from the spirit and scope of the invention. Accordingly, the invention is not limited except as by the appended claims.

I claim:

1. An inspection tool for use with a coordinate measuring machine to determine the location of a hole in a surface, comprising:
    centering means for holding the tool in fixed relative relation to the hole during tool usage, and providing a reference line in alignment with the center line of the hole, said centering means having a member positionable in the hole;
    first means measurable by the machine for determining coordinates of a first point aligned along said reference line, said first means being attachable to said centering means and having a substantially spherical surface portion positionable external of the hole and having a center point coincident with said first point; and
    second means measurable by the machine for determining coordinates of a second point aligned along said reference line, distant from said first point, said second means being attachable to said first means and having a substantially spherical surface portion positionable external of the hole and having a center point coincident with said second point, said substantially spherical surface portions of said first and second means having differing radii of curvature, whereby said coordinates of said first and second points may be used to determine the center line of the hole, the coordinates of the point of intersection of the center line with the known plane of the surface being the location of the hole.

2. The tool of claim 1, further including positioning means for positioning said first and second points at predetermined distances above the surface.

3. The tool of claim 1 wherein said first means includes a substantially spherical first member, and said second means includes a substantially spherical second member, said first point being the center point of said first member and said second point being the center point of said second member.

4. The tool of claim 3 wherein said centering means includes a shaft for insertion in the hole, said first member being attached to one end of said shaft, and said second member being attached to said first member from said shaft.

5. The tool of claim 4, further including a surface-engaging collar attached to said shaft and extending radially outward from the reference line for positioning said first and second members at predetermined distances above the surface.

6. An inspection tool for determining the location of a hole in a surface, comprising:
    a shaft sized for insertion in the hole and holding the tool in fixed relative relation thereto during tool usage, said shaft having a longitudinal axis in alignment with the center line of the hole when inserted therein;
    a first member having a substantially spherical surface portion, said first member being attached to said shaft, with the center point of said spherical portion of said first member aligned along said shaft axis; and
    a second member having a substantially spherical surface portion, said second member being attached to said first member remote from said shaft, with the center point of said spherical portion of said second member aligned along said shaft axis, said spherical portion of said second member having a smaller radius of curvature than said spherical portion of said first member.

7. The tool of claim 6 wherein said spherical portions of said first and second members are optically discernible.

8. The tool of claim 7 wherein said spherical portions are of contrasting colors.

9. The tool of claim 6, further including a surface-engaging collar attached to said shaft between said shaft and said first member, said collar having an engagement surface extending radially outward from said shaft axis for engaging the surface in which the hole is located and holding said first and second members at predetermined distances above the surface.

10. The tool of claim 6 wherein said second member is removably attached to said first member.

11. An inspection tool for determining the location of a hole in a surface, comprising:
- a shaft sized for insertion in the hole and holding the tool in a fixed relative relation thereto during tool usage, said shaft having a longitudinal axis in alignment with the center line of the hole when inserted therein;
- a first member having a substantially spherical surface portion, said first member being attached to said shaft, with the center point of said spherical portion of said first member aligned along said shaft axis;
- a second member having a substantially spherical surface portion, said second member being attached to said first member remote from said shaft, with the center point of said spherical portion of said second member aligned along said shaft axis, said second member being positionable in nesting relationship with said first member; and
- a collar attached to said shaft and having an engagement surface extending outward from said shaft for engaging the surface in which the hole is located and fixedly holding said first and second members in position external of the hole and above the surface.

12. The tool of claim 11 wherein said spherical portion of said second member has a smaller radius of curvature than said spherical portion of said first member.

13. The tool of claim 11 wherein said spherical portions of said first and second members have substantially equal radii of curvature.

14. The tool of claim 11 wherein said second member is removably attached to said first member.

15. The tool of claim 14 wherein said second member has a concave portion facing toward said first member for nesting of a portion of said first member therein.

16. An inspection tool for determining the locaton of a hole in a surface, comprising:
- a shaft sized for insertion in the hole and holding the tool in fixed relative relation thereto during tool usage, said shaft having a longitudinal axis in alignment with the center line of a hole when inserted therein;
- a first member having a substantially spherical surface portion, said first member being attached to said shaft, with the center point of said spherical portion of said first member aligned along said shaft axis;
- a second member having a substantially spherical surface portion, said second member being attachable to said first member remote from said shaft, with the center point of said spherical portion of said second member aligned along said shaft axis, said spherical portion of said second member having a smaller radius of curvature than said spherical portion of said first member; and
- a surface-engaging collar attached to said shaft between said shaft and said first member, said collar having an engagement surface extending radially outward from said shaft axis for engaging the surface in which the hole is located and holding said first and second members at predetermined distances above the surface.

17. The tool of claim 16 wherein said spherical portions of said first and second members are optically discernible.

18. The tool of claim 17 wherein said spherical portions are of contrasting colors.

* * * * *